United States Patent [19]
Coté et al.

[11] Patent Number: 6,110,533
[45] Date of Patent: Aug. 29, 2000

[54] POLYMERIC DESICCANT ARTICLES AND PROCESS FOR THEIR MANUFACTURE

[75] Inventors: Roland Coté, St. Laval; Sophie Hosette, Sainte-Julie; Mouloud Amazouz, Longueil, all of Canada

[73] Assignee: Her Majesty the Queen in right of Canada, as represented by the Minister of Natural Resources, Ottowa, Canada

[21] Appl. No.: 09/039,409

[22] Filed: Mar. 16, 1998

[51] Int. Cl.$^7$ ........................................................ B05D 3/10
[52] U.S. Cl. ........................ 427/341; 427/342; 427/389.9; 427/439; 427/508
[58] Field of Search ............................ 427/213.3, 213.32, 427/213.33, 430.1, 439, 341, 342, 377, 202, 508, 215, 220, 221, 204, 389.9, 394

[56] References Cited

U.S. PATENT DOCUMENTS

| | | |
|---|---|---|
| 3,005,456 | 10/1961 | Graham, Jr. . |
| 3,338,034 | 8/1967 | Hemstreet . |
| 3,669,103 | 6/1972 | Harper et al. . |
| 3,810,468 | 5/1974 | Harper et al. . |
| 3,980,663 | 9/1976 | Gross ...................................... 260/29.6 |
| 4,093,776 | 6/1978 | Aoki et al. . |
| 4,117,184 | 9/1978 | Erickson et al. . |
| 4,128,692 | 12/1978 | Reid . |
| 4,148,949 | 4/1979 | Casper et al. . |
| 4,172,164 | 10/1979 | Meyer et al. . |
| 4,255,171 | 3/1981 | Dravnieks . |
| 4,354,487 | 10/1982 | Oczkowski . |
| 4,418,163 | 11/1983 | Murakami et al. . |
| 4,594,860 | 6/1986 | Coellner et al. . |
| 4,605,401 | 8/1986 | Chmelir et al. . |
| 4,748,076 | 5/1988 | Saotome . |
| 4,769,053 | 9/1988 | Fischer, Jr. . |
| 4,826,917 | 5/1989 | Kondo et al. . |
| 4,835,020 | 5/1989 | Itoh et al. . |
| 4,842,927 | 6/1989 | Itoh et al. . |
| 4,865,886 | 9/1989 | Itoh et al. . |
| 4,875,520 | 10/1989 | Steele et al. . |
| 4,888,238 | 12/1989 | Katz et al. . |
| 4,948,659 | 8/1990 | Itoh et al. . |
| 4,962,172 | 10/1990 | Allen et al. . |
| 5,026,596 | 6/1991 | Saotome ................................... 428/264 |
| 5,052,188 | 10/1991 | Komarneni . |
| 5,071,681 | 12/1991 | Manning et al. . |
| 5,191,771 | 3/1993 | Meckler . |
| 5,350,443 | 9/1994 | von Blücher . |
| 5,447,727 | 9/1995 | Graham . |
| 5,453,323 | 9/1995 | Chambers et al. . |
| 5,496,397 | 3/1996 | Fischer et al. . |
| 5,505,370 | 4/1996 | Brown et al. . |
| 5,505,769 | 4/1996 | Dinnage et al. . |
| 5,534,304 | 7/1996 | Geursen et al. . |
| 5,542,968 | 8/1996 | Belding et al. . |
| 5,567,478 | 10/1996 | Houben et al. . |
| 5,614,147 | 3/1997 | Pellay . |

FOREIGN PATENT DOCUMENTS 1285931   7/1991   Canada .

*Primary Examiner*—Fred J. Parker
*Attorney, Agent, or Firm*—Jones, Tullar & Cooper, P.C.

[57] ABSTRACT

Articles comprising a substrate and a polymeric desiccant either impregnated therein or coated thereon are disclosed as well as processes for their manufacture. The invention also contemplates a process for synthesizing a polymeric dessicant in particulate form for use as such or for use as a coating material for desiccant articles.

14 Claims, No Drawings

POLYMERIC DESICCANT ARTICLES AND PROCESS FOR THEIR MANUFACTURE

FIELD OF THE INVENTION

The present invention concerns the manufacture of desiccant articles consisting of a substrate or other material onto which is synthesized a polymeric desiccant and, in particular, a dessicant article capable of multiple cycles of absorption and desorption of gases such as water vapour in the air or in any gaseous stream.

This article has possible applications in the field of air treatment, such as dehumidification, in systems for the transfer of moisture and heat between two air streams, in HVAC systems and in other applications involving moisture control and recovery.

BACKGROUND

The solid desiccants used in air treatment or liquid absorption systems are primarily inorganic (silica gel, molecular sieves, etc). They take the form of fine powders which must be bonded to a rigid substrate. There are a number of techniques for depositing these desiccants, some of which have been patented. Examples include patents filed in the United States under U.S. Pat. Nos. 3,338,034; 4,769,053; 5,052,188; 5,120,694; 5,496,397; and 5,542,968.

U.S. Pat. No. 5,542,968 describes a method which involves mixing the desiccant powder with fibres in a solution containing a binder and fire retardants, among other ingredients. A manufacturing process borrowed from the paper industry is then used to produce sheets of this compound. Canadian Patent No. 1,285,931 uses a technique which consists of coating a metallic substrate with a mixture consisting primarily of an inorganic desiccant and a heat-curable binder or adhesive in a solvent. The powder is then bonded to the substrate by heating the article. U.S. Pat. No. 4,172,164 describes the use of a solvent to partially dissolve the thermoplastic substrate, leaving the polymer particles imbedded in it following evaporation of the solvent. These techniques have the disadvantage of inhibiting to some extent the absorption of water by the desiccant powder, which may deliquesce and become detached under conditions of actual use.

Another category of articles relates to water absorption in diapers or sanitary napkins. The absorbent materials used in these applications are polymers capable of absorbing up to hundreds of times their own weight in water and are hence referred to as superabsorbents. U.S. Pat. Nos. 3,699,103 and 3,810,468 describe a method which consists of spreading a copolymer of acrylic acid and acrylamide, in powder form, on a fibrous material. This material is exposed to steam to swell the particles of powder, then compressed and dried to bond the polymer to the fibres. One of the disadvantages of this method is the fact that the polymer detaches from the fibres after absorbing the liquid and swelling. Another method described in U.S. Pat. No. 3,005,456 consists of treating the fibres with chloroacetic acid to permit the attachment of carboxymethyl groups for absorbency. This technique uses chloroacetic acid, a very expensive product, in a propanol solution. In addition, the absorptive capacity of the fibres is considered insufficient. Finally, another method described in U.S. Pat. No. 5,026,596 consists of producing a water absorbent polymer coated article which has excellent water absorption and swelling properties. This patent is the result of continual improvement of the techniques described in Japanese Patents Nos. 50-82143/1975, 55-84304/1980 and 58-84804/1983. These applications involve large quantities of polymer and, once it is swollen by the absorbed liquid, the structure of the article deteriorates and disintegrates.

SUMMARY OF THE INVENTION

The article of the present invention is intended for the absorption of water in gaseous form (i.e. water vapour or humidity) and not water in liquid form, as is the case with superabsorbents. With superabsorbents, the theory is to attempt to maximize the water-absorptive capacity of the polymer, which causes it to swell considerably. Absorptive capacities on the order of several tens to several hundreds of times the dry weight of the material are thereby obtained. In order not to restrict swelling, the polymer is weakly cross-linked. To that end, the cross-polymerizing agent (CPA) used during the synthesis to give a minimum of structure to the superabsorbent product is introduced in very small amounts. The proportion of CPA is typically on the order of 0.1% of the quantity of acrylic acid. Most cross-polymerizing agents dissolve readily in aqueous solution when used in such proportions.

In the case of the present invention, however, applicants try to control the swelling of the material when it absorbs water vapour or other gas and also to limit the absorption of liquid water. For this reason, the polymer of the present invention is strongly cross-linked. This is achieved by using a greater quantity of CPA than in the case of the superabsorbent materials. The proportion of CPA is typically on the order of 1% to 2% of the quantity of acrylic acid. For quantities of this magnitude, a solubility problem can arise with certain CPAs such as trimethylolpropane triacrylate. To solve this problem, it is necessary to replace part of the water used as solvent with an organic solvent such as acetone, in which the CPA dissolves more readily and more uniformly. The presence of organic solvents thus makes it possible to obtain a polymeric gel that is uniform and three-dimensional. Typically, the maximum quantity of water recommended is 35% by volume of the total volume of solution. Another advantage of the use of compatible organic solvents is that they do not alter the structure of certain supports such as cardboard or paper substrates containing a glue.

As an illustration, the maximum absorption capacity of the article of the present invention for deionized water is 7 times the weight of the polymer by itself or 2.5 times that of an article made of cardboard, for example, treated with 20% polymer by weight. A higher absorption capacity has the effect of destroying the structure of the article, which would make it difficult to obtain a product that is sufficiently rigid for some applications such a humidity exchanger. In addition, this article is designed to withstand a very large number of absorption/desorption or dehumidification/regeneration cycles, which is not the case with the super-absorbent materials. These are generally designed for single-use applications (diapers, paper towels, toilet paper, etc.).

In this application, applicants are also seeking a high rate of absorption and desorption, so that the article reacts rapidly to a sudden variation in the concentration of water vapour or other gases in the flow of air in contact with the desiccant. Deposition of the polymer in a thin layer on the walls of the substrate makes it possible to obtain very rapid sorption kinetics.

In general, the process of the present invention consists of impregnating a substrate of a given shape with a monomer solution and heating it to initiate polymerization. This process does not alter the desiccant's absorptive properties. In addition, it gives the substrate a number of other interesting properties, including mechanical rigidity and fire resistance. Due to the thermal properties of the polymer, the desiccant article is also capable of transferring heat from a warm air (gas) stream to a cool air (gas) stream within a recovery system. The bond obtained between the desiccant and the substrate is very strong and permits it to withstand a large number of absorption and desorption cycles without any deterioration in absorptive properties or physical characteristics. A further advantage of this technique is the fact that these properties can be controlled by adjusting the composition and quantity of polymer. Most supports made from natural or synthetic cellulose fibres are permeable to air, which can pose a contamination problem in certain applications such as air exchangers. Treatment of this type of support with the polymer makes it much more air-tight and also more rigid, even using amounts of the polymer on the order of only 10% by weight. Cellulosic-based substrates are preferred due to their chemical affinity for polymer and low cost. Preferably, the support is made from corrugated cardboard or paper due to the high quality/price ratio. However, other types of substrate made from natural or synthetic fibres, woven or non-woven, can be used. The polymer has also been successfully deposited on silica-gel powder in order to fix it by some other technique, such as gluing on to substrates made of metal or plastic material. Other inorganic powders (talc, etc.) or organic powders (skeletons of microorganisms, etc.) can also be used.

The monomer solution consists primarily of a member of carboxylic acid family such as acrylic acid or methacrylic acid, a homolytic reaction initiator such as peroxide and a cross-polymerization agent such as trimethylolpropane triacrylate. The mixture is soluble in water and/or a solvent such as acetone.

Following impregnation with the solution, the substrate is heated in a chamber with low oxygen to a temperature of between 60° C. and 80° C. (140° F. and 176° F.) to effect polymerization.

The acidic polymer is then placed in contact with an alkaline solution of sodium, potassium or other hydroxide, to transform it into a salt. This operation gives the polymer its absorptive properties, the cations being linked to the polymer chain in an ionic manner.

DETAILED DESCRIPTION OF THE PREFERRED EMBODIMENT

The technique first presented here consists of manufacturing a desiccant article from a cellulose-based substrate and a polymerizable monomer solution, to permit the absorption of gaseous products such as water vapour. The product must retain its physical structure and sorptive properties even after repeated use. Polymer-based desiccants have the advantage of being readily modified to obtain the desired absorptive properties, as well as other properties of interest for certain applications. They can also be obtained in a number of geometric forms. Some have a certain affinity for structural products used as substrates, which can facilitate bonding.

For one of the potential applications of the article developed, a potassium salt of polyacrylic acid has been polymerized on a paper or cardboard substrate. The water vapour absorption properties of the desiccant are in no way affected by the presence of the substrate, even when the proportion of polymer by mass is relatively low. In addition, the article possesses good fire resistance and acceptable mechanical strength.

The process consists of preparing a monomer solution with a base of acrylic, methacrylic or itaconic acid or a mixture thereof. The concentration of the base monomer in the solution can be adjusted on the basis of the desired proportion of desiccant by mass to be obtained. In the preferred embodiment, acrylic acid is used. The quantity of acrylic acid should be between 2.5M and 4.0M; at less than 2.5M, the gel obtained will be insufficiently rigid, and above 4.0M, there is a risk of the reaction being too violent (exothermic) and thus difficult to control. Between 20% and 90% of the carboxyl groups must be neutralized by the addition of potassium hydroxide (KOH) or another base. Preferably, 50% of the carboxyl groups must be neutralized by adding a solution of KOH dissolved in water. The total quantity of water in the final solution must not exceed 35% of the overall volume. A greater volume of water would risk destroying the structure of the cellulosic fibre support and would limit the maximum quantity of dissolved cross-polymerizing agent.

The monomer is then mixed with a sufficient quantity of a homolytic reaction initiator such as a peroxide, azabisisobutyronitrile or other initiator, in water, acetone and/or other solvents. The amount of reaction-initiating agent must be sufficient to start the reaction, that is, about 1% of the total solution volume, although an excess of this substance would have no impact on the polymerized product.

A cross-polymerization agent such as trimethylolpropane ethoxylate triacrylate, divinylbenzene or other cross-polymerization agent is added to the solution in a quantity corresponding to the desired density of cross-linkages to be obtained in the polymer. To obtain an article capable of absorbing enough water vapour without excessive swelling, it is necessary to use 0.1% to 2.0% by volume of a cross-polymerizing agent, preferably trimethylolpropane triacrylate. The increase in volume (or swelling) of the desiccant material as a result of the absorption of water vapour can be controlled by the proportion of cross-polymerization agent used to synthesize the polymer.

A quantity of organic solvents (acetone, for example) must be added to bring about complete solution. Other solvents may be used or mixed with the acetone. In order to minimize loss of acrylic acid during the heating phase, it is possible to use propylene glycol, ethylene glycol or other solvents compatible with acetone and having a high boiling point.

The solution is well mixed, then applied evenly to the cellulose-based substrate. The article, impregnated with the solution, is placed in a closed chamber containing minimum oxygen and heated to a temperature sufficient to initiate polymerization. The polymerization reaction thus initiated should be completed within a few minutes, depending on the rate of thermal exchange in the chamber. Since polymerization is a radical reaction which is blocked in the presence of oxygen, it is therefore preferable to minimize the amount of oxygen in the solution in order to avoid the formation of short-chain molecules or a poor polymerization yield. The presence of minute quantities of oxygen should have no perceptible effect on the quality of polymerization. In practice, purging with a flow of nitrogen or argon is usually sufficient to displace any oxygen dissolved in the solution or present in the dead space around the article.

Heating temperature must be sufficient to initiate polymerization, but must not lead to excessive evaporation of the acrylic acid. A temperature of 80° C. to 120° C. is suggested. Preferably, the heating equipment will be sufficiently powerful to minimize the heating time. Highfrequency or microwave ovens are especially recommended, but a sufficiently powerful conventional oven can be used effectively and can reduce manufacturing costs.

The extent of cross-linkage is fixed by the amount of cross-polymerizing agent which has actually reacted during the polymerization. To that end, it is important to ensure that it is uniformly and completely dissolved in the monomer solution. In the present case, where the preferred agent is trimethylolpropane triacrylate which has limited aqueous solubility, it is necessary to use organic solvents such as acetone, propylene glycol as well as other compatible solvents. The organic solvents promote improved solubility of the cross-polymerizing agent, which makes it possible to obtain a polymeric gel with a three-dimensional structure. It is preferable to limit the volume of water to 35% of the total volume of monomer solution.

Once the polymerized solution is bonded to the substrate, the polymer is placed in contact with a hydroxide solution of sodium, potassium, lithium, ammonium or other monovalent or bivalent cations. The polymer is transformed into a salt of the cation corresponding to the alkaline solution used to give the polymer its absorptive properties. In the preferred embodiment, the acrylic acid based polymer is converted to a polyacrylic acid salt by wetting the article with a solution of potassium hydroxide or sodium hydroxide dissolved in methanol. Potassium hydroxide is preferred as it gives the polymer better absorptive properties.

The substrate and the desiccant are then dried to form a rigid article.

It has also been found that the polymeric desiccant can, in general, be similarly synthesized onto other materials or particles such as silica gel or other organic or inorganic powders. Finely powdered silica gel, for example can be added to a mixture containing the homolytic reaction initiator solution and the acrylic acid solution. The mixture is then permitted to polymerize under suitable temperature and atmospheric (low oxygen) conditions. The resultant acidic polymer containing the silica gel is ground into small particles and then transformed into its salt by wetting with a suitable alkaline solution to give the polymer its absorptive properties. This material is dried and may then be further crushed or pulverized to obtain a desiccant powder. This desiccant powder may then be used as such or may be applied using known techniques, such as with adhesive, to a variety of substrates like metals and plastics.

Illustrations of the principles of the present invention are provided by way of the following examples which are not to be considered as limiting. The production method may be modified and other chemicals may be used in various quantities as will be understood by those skilled in the art.

EXAMPLE 1

Polyacrylic Acid Potassium Salt on Cellulose

The desiccant polymer is synthesized directly on a cellulose support in a series of steps. A commercially available corrugated cardboard is provided to be used as a support for the samples. First of all, the support is moistened with an aqueous homolytic reaction initiator solution (solution A1) mixed with an acrylic acid solution (solution B1) in ratios of 1/10 and 9/10 respectively. The wetted cardboard is then purged with argon and heated in the drying oven to 80° C. to permit polymerization. Finally, the acid polymer is transformed into a potassium salt by immersion in a solution of potassium hydroxide. After drying in the drying oven, the product resembles plasticized cardboard.

Experimental Protocol

1) Substrate

Commercially available corrugated cardboard

2) Aqueous homolytic reaction initiator solution (solution A1)

5 grams of sodium persulphate are dissolved in 100 ml of deionized water.

3) Acrylic acid solution (solution B1)

274 ml of acrylic acid (4 M) and 275 ml of 1,2-propanediol are placed in a 2 l flask mounted with a septum and a bubbler. The acrylic acid solution is cooled to under 10° C. in an ice and water bath. 132 g of potassium hydroxide (85%, 2M) are transferred into a 500 ml beaker together with enough deionized water to make 250 ml. The heat released by the KOH as it dissolves is dissipated by placing the beaker in an ice and water bath. This solution is then added slowly to the acrylic acid solution; the temperature of the mixture should not exceed 30° C. Following this addition, 27 ml of trimethylolpropane ethoxylate triacrylate (7/3) and 200 ml of acetone are added. The solution is stirred with a magnetic stir bar for one hour at room temperature. This produces 1 liter of a polymerizable solution containing a 4M concentration of acrylic acid, half of which has been neutralized as a potassium salt.

4) The corrugated cardboard is immersed in the acrylic acid solution mixed with the aqueous solution in ratios of 9/10 and 1/10 respectively. The excess solution is removed by means of a paper towel. The cardboard is then placed in a glass desiccator. A mechanical pump is used to create a vacuum in the desiccator, and argon is then introduced into the desiccator to establish atmospheric pressure. The purging operation is repeated to remove as much oxygen as possible from the acrylic acid solution and the desiccator. The desiccator is then placed in the drying oven at 70 to 80° C. for two hours to permit polymerization.

5) Finally, the corrugated cardboard is immersed in a solution of potassium hydroxide (KOH) for approximately twenty minutes. The solution is prepared by adding 5.0 g to 100 ml of methanol and 50 ml of deionized water. The cardboard is then dried in the drying oven. The initial weight of the corrugated cardboard was 0.758 g. After synthesis of the desiccant polymer, its weight is 0.953 g, a difference of 0.195 g, representing the quantity deposited on the cardboard, or 20% by weight of polymer deposited on the corrugated cardboard. It is then washed again with methanol and dried to ensure quantitative polymerization. Microgravimetric measurements have given the following absorption capacities (percentage dry mass of polymer) as a function of the relative humidity of the air:

TABLE 1

| Relative humidity of the air (%) | 30 | 60 | 90 |
|---|---|---|---|
| Absorption capacity (%) | 35 | 45 | 90 |

The product is fire resistant as well and does not support the development of airborne bacteria. The article allows very little air permeability. Note that the concentration of acrylic acid (2.5M in this example) may be increased to obtain a larger deposit of polymer and would thus absorb more water vapour or other gases; for example, a 4M concentration of acrylic acid would produce a deposit of approximately 32% by weight.

EXAMPLE 2

Powdered Polyacrylic Acid Potassium Salt on Silica Gel

A desiccant powder is obtained when acrylic acid is polymerized on silica gel. Synthesis is performed by mixing the acrylic acid solution (solution B2) with the homolytic reaction initiator solution (solution A2) and adding this mixture to finely powdered silica gel. The mixture is then purged with argon and polymerized by heating in the drying oven. The acid polymer is ground into small particles and transformed into a potassium salt by immersion in a solution of potassium carbonate. The material is then dried and crushed to a fine powder.

Experimental Protocol

1) Base Material

Aldrich silica gel (5.0 g, 2–25 $\mu$m, 500 $m^2/g$).

2) Aqueous homolytic reaction initiator solution (solution A2)

200 mg of sodium persulphate dissolved in 10 ml of water.

3) Acrylic acid solution (solution B2)

Same as solution B in Example 1

4) The Aldrich silica gel is transferred into a 250 ml flask mounted with a vacuum head and septum. The silica gel is purged twice with argon. One milliliter of the initiator solution (solution A2) is aspirated into a 10 ml syringe, then 9 ml of the acrylic acid solution is aspirated into the same syringe and mixed with the initiator solution. The resulting solution is then added to the silica gel and the system is purged twice more with argon. The silica gel/aqueous solution mixture is heated in the drying oven for 2 hours at 60° C. The product recovered after heating resembles a flexible plastic completely enveloping the silica gel.

5) This product is ground into small particles and dispersed in a water-methanol solution (50 ml of each) containing 5.0 g of potassium carbonate. It is allowed to stand for two hours in suspension in the alkaline solution; the particles are then filtered and dried in the drying oven. The white product recovered after drying is crushed into a fine powder using a mortar and pestle.

The weight of the white product is 7.97 g. This material consists of 5.0 g of silica gel together with a deposit of 2.97 of desiccant polymer. This procedure is merely an example of a deposit performed; the protocol is not necessarily optimal and certain chemicals may be replaced by other compatible products.

It will be understood from the foregoing that the examples and embodiments referred to herein are intended to be illustrative of the principles of the invention and should not be construed as limiting. Those skilled in the art will appreciate that various modifications and/or substitutions in both the materials and the process can be effected without departing from the spirit and scope of the invention as defined in the appended claims.

We claim:

1. A process for making a desiccant article for repeated cycles of water vapour absorption and desorption comprising the steps of:
   (a) preparing a polymerizable organic solution containing a polymerizable monomer selected from the group consisting of acrylic acid, methacrylic acid and itaconic acid in which up to 50% of the carboxyl groups are neutralized by treatment with a base, a homolytic reaction initiator, at least 0.1% by weight of a cross-polymerization agent and an organic solvent, said polymerizable organic solution containing less than 35% by weight of water;
   (b) impregnating a cellulose fibre substrate with the solution defined in (a);
   (c) heating the the impregnated substrate in a substantially oxygen-free atmosphere to initiate polymerization of the monomer;
   (d) treating the polymerized substrate in an alkaline solution to transform the polymer into a salt; and
   (e) drying the article.

2. The process of claim 1 wherein the cellulose fibre substrate is paper or cardboard.

3. The process of claim 2 wherein the cellulose fibre substrate is in flat or corrugated form.

4. The process of claim 1 wherein the monomer is acrylic acid which is present in the solution in a concentration between 2.5M to 4.0M.

5. The process of claim 4 wherein the homolytic reaction initiator is peroxide, sodium persulphate or azabisisobutyronitrile.

6. The process of claim 1 wherein the amount of cross-polymerization agent in the solution is between 0.1–2% by weight.

7. The process of claim 1 wherein the organic solvent is acetone or a glycol.

8. The process of claim 1 wherein the cross-polymerization agent is trimethylolpropane triacrylate.

9. The process of claim 6 wherein the amount of cross-polymerization agent in the solution is between 1–2% by weight of the amount of acrylic acid.

10. The process of claim 1 wherein the cross-polymerization agent is trimethylolpropane ethoxylate triacrylate or divinyl benzene.

11. The process of claim 1 wherein the polymerizable organic solution is heated to a temperature of from 60° C. (140° F.) to 80° C. (176° F.) to initiate polymerization.

12. The process of claim 1 wherein the alkaline solution contains a monovalent cation of potassium, sodium, lithium or ammonium.

13. The process of claim 1 wherein the alkaline solution contains potassium hydroxide or sodium hydroxide dissolved in methanol.

14. The process of claim 1 wherein about 20–50% of the carboxyl groups in the monomer are neutralized.

* * * * *